Aug. 30, 1938.  O. C. SCHMIDT  2,128,735
RECEPTACLE FILLER
Filed May 1, 1936   3 Sheets-Sheet 1
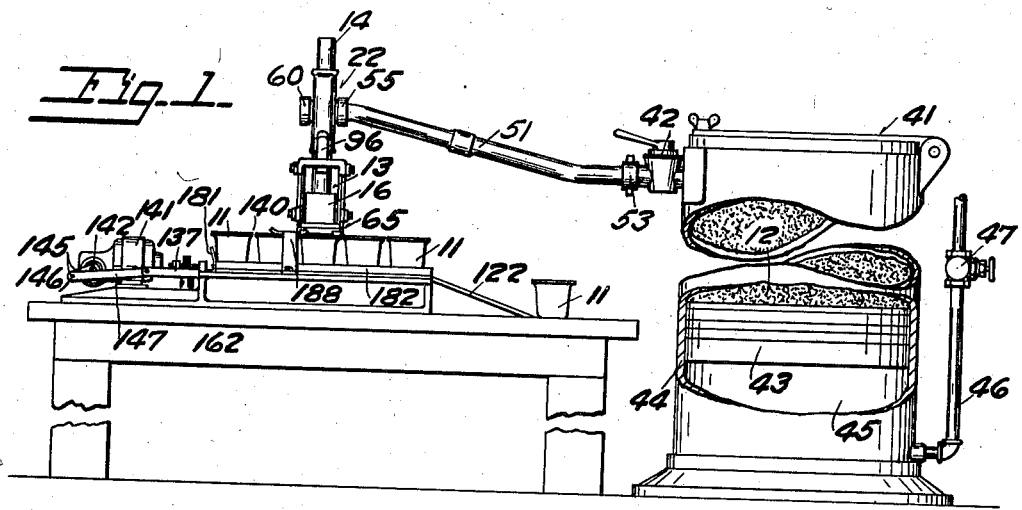
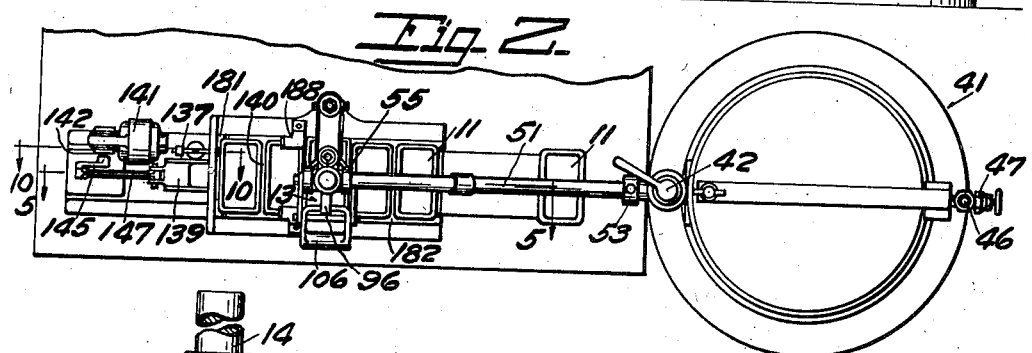
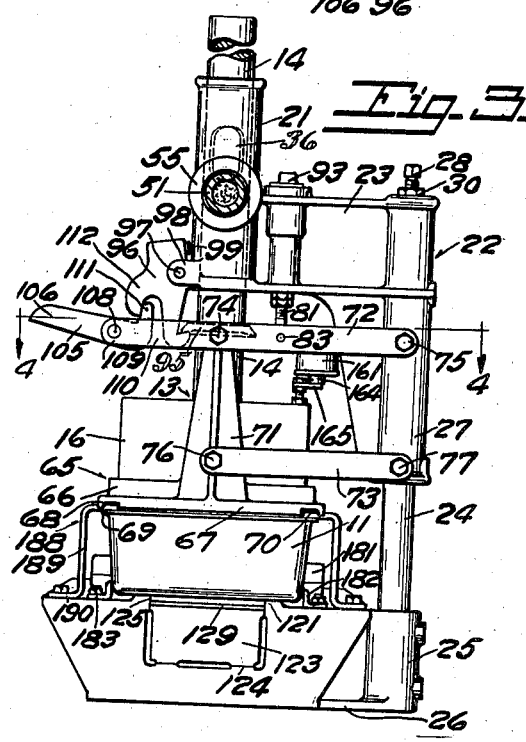
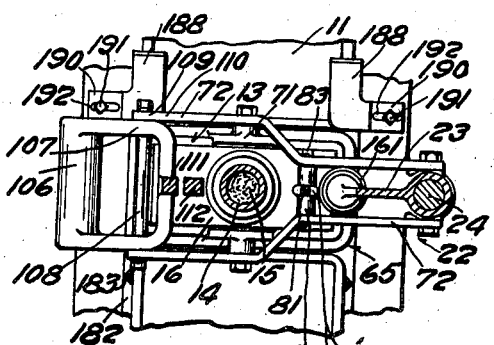
INVENTOR:
Oscar C. Schmidt,

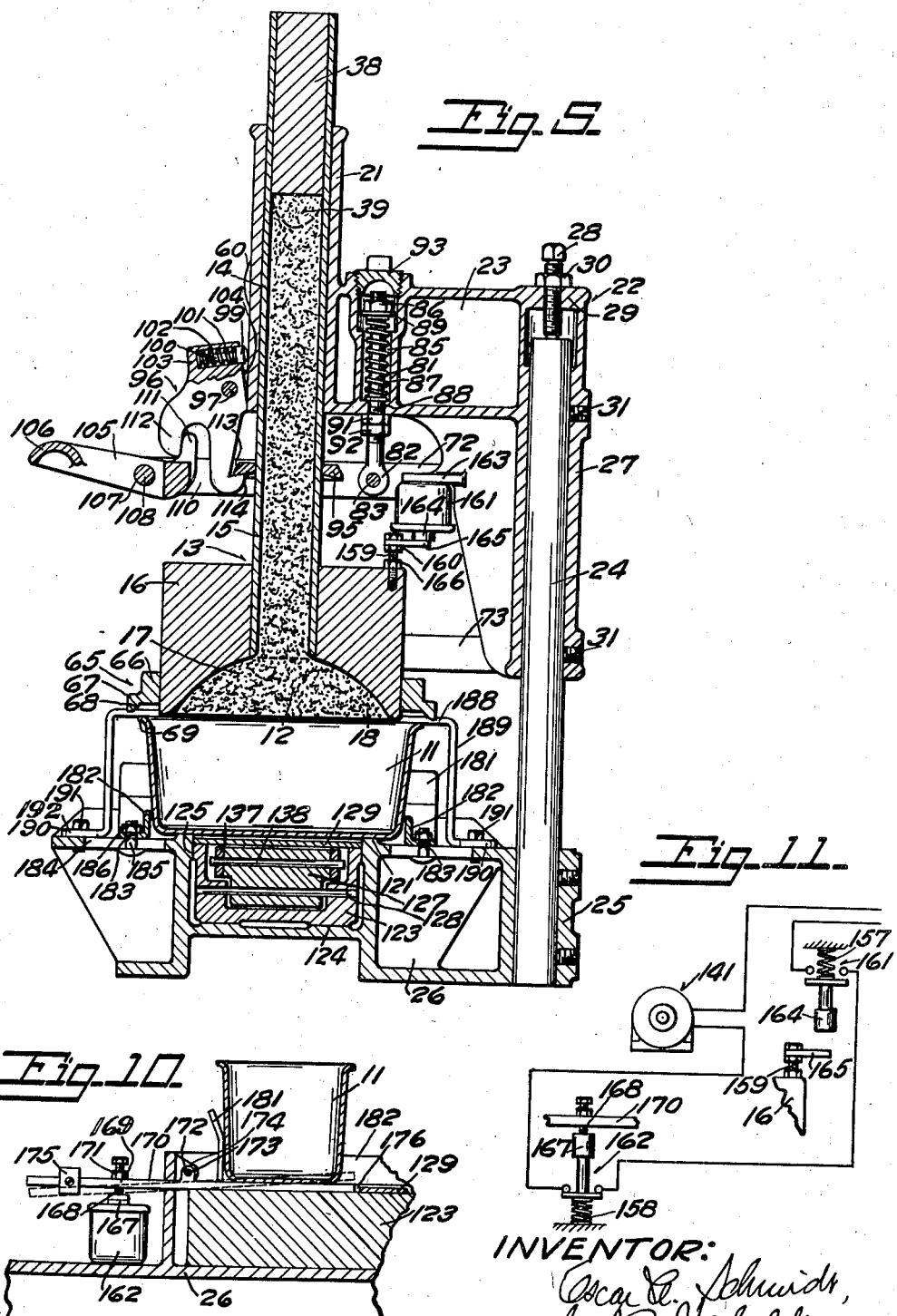

Aug. 30, 1938.　　　O. C. SCHMIDT　　　2,128,735
RECEPTACLE FILLER
Filed May 1, 1936　　　3 Sheets-Sheet 3
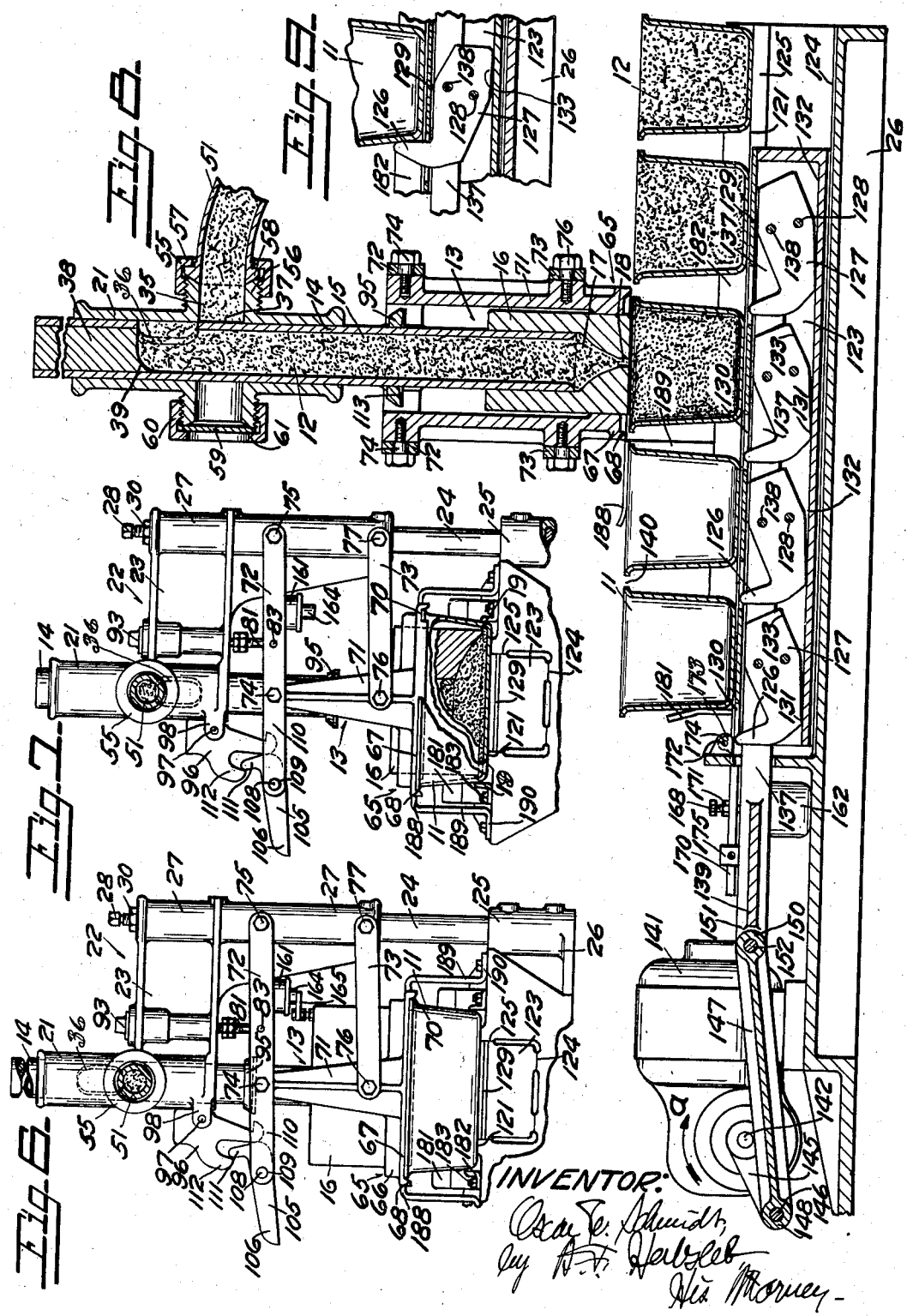
INVENTOR Patented Aug. 30, 1938

2,128,735

UNITED STATES PATENT OFFICE 2,128,735

RECEPTACLE FILLER

Oscar C. Schmidt, Cincinnati, Ohio, assignor to The Cincinnati Butchers' Supply Company, Cincinnati, Ohio, a corporation of Ohio Application May 1, 1936, Serial No. 77,367

22 Claims. (Cl. 226—94)

My invention relates to receptacle fillers for filling receptacles with plastic material, and is exemplified as employed in filling baking pans with meat dough, although it is obvious it may be employed in other relations.

Meat dough of this character is a plastic material containing finely ground or chopped meat and various ingredients, and is a thick, flowable mass somewhat similar to sausage meat which is stuffed into sausage casings for making sausages. In the present instance the meat dough is fed into a pan for being baked to form a meat loaf.

Such meat dough has usually heretofore in the butchering art been placed in the pan by throwing a batch of the same forcefully into the pan in an attempt to simultaneously eject the air from the pan and from the mass of meat dough, it being found in such practice, however, that air pockets form between the meat dough and the pan and in the meat dough, and that portions of the meat dough fail to properly unite with each other and with the bulk of the dough, and that the resultant baked loaf contains pockets of air, seams and fissures, and readily separable lumps, making the loaf defective.

It is the object of my invention to avoid these objections and to provide novel means for filling the pan or receptacle in such manner that air is ejected from between the material and the wall of the receptacle and from the material, and for causing the material to flow into the receptacle while pressure is applied to the material in the receptacle in such manner as to exclude and prevent the formation of air pockets and bubbles between the material and the wall of the receptacle and in the material; and, further, to provide novel means for coaction between the pans or receptacles and the feeding devices for the plastic material; and, further, to provide novel feeding relations between the pans or receptacles and the feeding of the plastic material; and, further, to provide for alternate feeding movements of the pans or receptacles and the plastic material.

My invention consists in novel means whereby to feed the plastic material into the receptacle and in novel pressure means for maintaining pressure upon the mass of material in the receptacle as it accumulates in the receptacle; further, in providing novel means for maintaining pressure upon the receptacle during feeding of the material; further, in providing novel means for maintaining the material feeding means in retracted relation; further, in providing novel means for controlling the material feeding devices; further, in providing novel means relating the controls for feeding the receptacles and for filling the receptacles; further, in providing a novel feeding plunger for feeding the plastic material; further, in providing novel operating means for the same; further, in providing novel means for placing the receptacles in proper relation with the feeding devices; and, further, in providing novel means to properly relate the feeding movements and the receptacle placing devices.

The invention will be further readily understood from the following description and claims, and from the drawings, in which latter:

Fig. 1 is a side elevation of my improved device, shown in connection with an exemplifying sausage stuffing machine, instanced as employed in supplying meat dough as the plastic material, and an exemplifying feeding means for the receptacles, partly broken away.

Fig. 2 is a plan view of the same, partly broken away.

Fig. 3 is an end view of my improved device.

Fig. 4 is a cross-section of the same, taken on the line 4—4 of Fig. 3.

Fig. 5 is a vertical section of the same, taken on the line 5—5 of Fig. 2, and partly broken away, and showing the relations of the parts in retracted positions ready to begin a filling or pan moving operation.

Fig. 6 is an end elevation showing the parts in partially actuated relation, and partly broken away.

Fig. 7 is a similar view showing the plunger in fully depressed position, and partly broken away.

Fig. 8 is a vertical section of my improved device, taken on the line 8—8 of Fig. 2, and partly broken away.

Fig. 9 is a similar sectional view of a detail of the same, showing the parts in actuated relation.

Fig. 10 is a sectional view of a detail, taken on the line 10—10 of Fig. 2, showing the receptacle operated switch lever in actuated position in full lines and in retracted position in dotted lines; and, Fig. 11 is a diagrammatic representation of the motor circuit.

My invention is an improvement on the invention shown, described and claimed in the application of George Schlereth for patent on improvement in Receptacle fillers and method of filling receptacles, Serial No. 72,589, filed April 3, 1936, and on the invention shown, described and claimed in my application for patent on improvement in Receptacle fillers, Serial No. 76,440, filed April 25, 1936, in the United States Patent Office.

The receptacles into which it is desired to place the plastic material are represented as baking pans 11 in which to bake meat loaves. Plastic material which is to be placed in the receptacles is represented as meat dough, exemplified at 12. The material is arranged to be fed into the receptacle by means of a feeding plunger 13, which comprises a feeding channel 14, shown as a tube, provided with a feeding passage 15 and a feeding head 16, which is instanced as serving as a pressure piece, having a feeding passage 17, which registers with the feeding passage in the channel or tube, and a feeding mouth 18 discharging into the receptacle.

The feeding head is arranged to be moved into the receptacle so as to initially discharge substantially at the bottom of the receptacle. The lower end of the tube is shown imbedded in the feeding head so as to form a tight joint therewith. The feeding head is preferably of substantial weight, as by being formed of heavy metal, in order that the plunger will automatically descend quickly by gravity. The plunger is caused to move upwardly by the pressure of the plastic material under the same when the plunger is in the receptacle, so as to be automatically returned to initial position.

The feeding head is shown of rectangular form in cross section corresponding to the rectangular form of the pan, and is arranged to be received in the pan so that the bottom of the feeding head is substantially at the bottom of the pan. There is preferably a slight space 19 between the lateral margins of the feeding head and the upright walls of the pan for permitting air to escape from between the plunger and the pan when the plunger is introduced into the receptacle and whilst the plastic material is being fed into the pan. When the plunger is released to drop into the pan, its descent is cushioned by the air in the pan, the air, however, being displaced by the plunger.

The tube 14 forms a slide which extends upwardly from the feeding head and is reciprocable in a bearing 21 of a standard 22, the bearing being on a bracket 23 which extends laterally from the upwardly extending portion of the standard.

The standard comprises a post 24, extending upwardly from a bearing 25 of a base 26. A sleeve 27 is located about the post, the bracket 23 extending laterally from this sleeve. The sleeve and bracket, and consequently the bearing 21, are vertically adjustable on the post, as by means of a bolt 28, having threaded connection in a threaded bearing in the upper wall 29 of the sleeve, and clamped in adjusted positions by a jam nut 30. Set screws 31 threaded into the sleeve and contacting the post aid in holding the parts in adjusted positions.

The bearing 21 is provided with laterally extending feeding passages 35, either of which may be employed in feeding the plastic material to the plunger. The tube has a feeding port 36 presented to that side of the bearing at which the feeding passage to be employed is located. The inner end of the wall of the feeding passage forms a port 37, which coacts with the feeding port 36 to form an automatic valve for the plunger. The port 37 is normally closed by the body of the tube 14, the plastic material passing through the ports when the port 36 is in registry with the port 37. The upper portion of the tube is provided with a filling 38 to close the same, the lower end of the filling being slanting, as at 39, opposite the port 36 to direct the plastic material into the passage 15.

The source of supply for the plastic material is exemplified as a usual stuffing machine 41, in which the supply of meat dough is contained. The meat dough is arranged to be forced through a suitable valve 42, connecting with the interior of the stuffing machine. This forcing of the meat dough is obtained by means of a suitable piston 43, forced upwardly in the cylinder 44 by a suitable pressure fluid fed into the space 45 under the piston and supplied to said space through a suitable pipe 46 having a suitable valve 47 therein. Such a stuffing machine is shown and described, for instance, in Letters Patent of the United States No. 2,004,618, granted on my application for improvement in Press head for stuffing machines, and dated June 11, 1935.

A feed pipe 51 has one end thereof secured to the feed valve 42 by a suitable coupling 53. The other end of the pipe is secured to the bearing 21 at the passage thereof which is to be employed as the feeding passage, by means of a coupling ring 55 threaded over the threaded boss 56 in which said feed passage is located, a flange 57 of the coupling ring clamping an annular flange 58 of the pipe between it and the end of said boss to form a joint. The feed pipe is preferably bent and swivels in its connections with the bearing and the feed valve so as to accommodate itself to various relative positions and heights between the filling device and the stuffing machine. The feed passage not employed is closed by a disk 59 clamped over the end of the boss in which the other of said feed passages is located, by means of a coupling ring 60 for clamping the disk between an annular flange 61 of the said coupling ring and the annular end of said last-named boss.

The meat dough is caused to exude through the valve 42, when the valves 42 and 47 are opened and upward pressure is being exerted by the piston 43, for causing the meat dough to pass through the feed valve 42, the pipe 51, the feed passage 35, the ports 37 and 36, the feed passage 15 in the tube 14, the feed passage 17 and discharge mouth 18 in the feeding head 16, when the plunger is lowered, to cause registry between the feed port 36 and the feed port 37 respectively in the tube and in the bearing, for causing feeding movement of the meat dough and introduction thereof into the receptacle.

If it is desired to place the stuffing machine 41 at the opposite side of the filling machine, the connection of the pipe with the filling machine may be changed so that the pipe and the obstructing disk 59 cooperate with the opposite filling passages 35 of the bearing.

A positioner 65 is provided between the plunger and the receptacle. It is provided with a guide 66 cooperating with the feeding head and with positioning flanges 67 having inner slanting faces 68 cooperating with the pan rim 69 for accurately positioning the pan. The positioner serves as a presser part to properly hold the pan during the filling operation. These flanges preferably surround the upper edges or rim of the pan, and have notches 70 at their corners.

The positioner is provided with upwardly extending hangers 71. Links 72, 73 are located one above the other at the respective sides of the sleeve 27 and said respective hangers, the links 72 being pivoted to the upper portions of the hangers and the sleeve respectively on pivots 74, 75, and the links 73 being pivoted therebelow respectively to the hanger and the sleeve on pivots 76, 77, said pivots being respectively shown as shoulder bolts. This insures parallel motion for the positioner in raising and lowering the same.

The positioner is normally urged upwardly, as by means of a rod 81 pivoted by a pivot bearing 82 about a pin 83 having connection with and extending between the links 72, collars 84 being located between said pivot bearing and said links. The rod extends into a cavity 85 in the bracket 23, a nut 86 being threaded about said rod to adjust a helical spring 87 located between the bottom 88 of said cavity and a washer 89 resisted by said nut, for urging the rod upwardly and thereby raising the positioner 65. Downward movement of the rod is limited by engagement of the washer with the shoulder therebelow in the cavity (Fig 5). This upward movement is adjustably limited by a positioning nut 91, a jam nut 92 clamping the positioning nut in adjusted position. The positioning nut contacts the bottom 88 of the cavity 85, the rod passing through a hole in said bottom. A plug 93 closes the upper end of said cavity.

The tube 14 is provided with a keeper 95, shown as an annular flange extending laterally from the tube and fixed to the tube. A latch 96 coacts with said keeper to hold the plunger in retracted position. The latch is pivoted on a pin 97 extending therethrough and located in pivot lugs 98 on the bearing 21. A knob 99 has the shank 100 surrounded by a spring 101 in a hole 102, in the heel 103 of said latch. The spring is located between the bottom of said hole and said knob and urges the knob outwardly for resiliently holding said latch in engaging relation. The disengaging movement of said latch is limited by contact of the contact face 104 on said heel with the bearing 21.

The latch is operated by an operating lever 105 having an operating handle 106 and a bearing 107 on a pivot pin 108, the respective ends of which are located in bearings 109 in extensions 110 of the links 72, constituting said links as levers for operation of the positioner. The operating lever is provided with a finger 111 coacting with a finger 112 on the latch lever for unlatching the latch.

The keeper is provided with a bevel face 113 and the latch is provided with the coacting bevel face 114 for readily moving the keeper into engaging relation with the latch when the plunger is raised.

To release the plunger, the operating handle 106 is depressed, thereby moving the latch in unlatching direction and depressing the lever 105. The engaging relation between the fingers 111, 112 is maintained throughout movement of the operating lever, whereby desired depressing movement of the positioner 65 is also obtained, as these fingers become fulcrums during the depressing movement of the operating handle for causing movement of the positioner toward the pan.

The parts are so related that if the pan be not properly placed so that the depending flanges of the positioner are not received about the upper edges of the pan, the downward movement of the positioner is arrested, thereby arresting the downward movement of the links 72, 73 and preventing release of the latch 96 from the keeper 95, to prevent descent of the plunger and consequent interference between said plunger and the wall of the pan. If the depending flanges of the positioner are received about the edges of the pan, the inner slanting faces of said flanges will further center said pan. Descent of the plunger during obstructing position of a pan can result in no harm as the descent will merely stop when the plunger strikes the pan.

In order to provide a supply of fresh pans under the plunger upon successive descents of the plunger and to insure non-interference between the plunger and said pans, I provide a feeding means for the pans controlled by the position of the plunger to avoid interference between movements of the pans and the plunger.

The base 26 is provided with runways 121 at its respective sides on which the pans are arranged to slide, an extension 122 of said runways extending beyond the base being arranged to receive the pans as they are being fed off of the base.

A carriage 123 is arranged to reciprocate in the base, resting on guideways 124 and being laterally guided by guideways 125 on the base. Actuating fingers 126 are on actuating levers 127, pivoted on pivot pins 128 extending between the sides of the carriage. A cover plate 129 covers the carriage and has openings 130 therein through which the fingers project. These levers are provided with resting faces 131 arranged to rest on the bottom cross wall 132 of the carriage, with the upper ends of the fingers below the plane of the bottoms of the pans, so that the fingers may be retracted past the pans. The levers are also provided with stop faces or heels 133 at the other sides of their pivots for contacting the bottom of the carriage when the fingers are in up-position to push the pans.

Actuating bars 137 are at the respective ends of said levers and are pivoted to said respective levers by pivot pins 138. These actuating bars extend lengthwise of the carriage and are connected by a cross head 139 at their operating ends. Movement of these bars in receptacle feeding direction causes swinging movement of the pusher levers 127 on their pivots 128 during the first portion of such movement of such bars for moving the pusher fingers upwardly into engagement with the respective pans, whereupon the heels of said pusher levers strike the bottom of the carriage for arresting pivotal movements of said levers and thereby causing combined movements of the pusher levers and the carriage in feeding direction upon further movement of the bars in such direction, whereby to feed the pans to the extent of the width of a pan, and the space 140 between neighboring pans, feeding a pan which has been under the plunger and has been filled, away from the plunger, and feeding the next empty pan centrally under the plunger. The feeding stroke of the carriage is the distance between centers of neighboring pans in feeding direction.

An electric motor 141 is mounted on the base and has suitable geared connection with a cross shaft 142 so as to rotate this cross shaft at slower speed than the speed of rotation of the rotor shaft of the electric motor.

A crank 145 is fixed to this cross shaft and has a crank pin 146 fixed to its outer end. A connecting rod 147 has a bearing 148 at one of its ends about the crank pin and is held thereon by suitable means. The other end of the connecting rod has a bearing 150 through which and bearings 151 on the cross head 139 a connecting pin 152 extends, being held therein by suitable means.

Means are provided for relating the movements of the pans and the plunger to prevent interference between them, and further to insure placing of successive pans centrally under the plunger, and to prevent feeding of pans during interfering position of the plunger. Control means for placing the feeding means for the pans in feeding relation are controlled respectively by the position of the plunger and the presence of a pan to enable feeding motion to be imparted to the pans. The safety means are instanced as interruptions in the driving means for the pan feeding devices and are exemplified as electric translating devices controlling the actuations of the pan feeding electric motor.

Thus an electric switch 161 is arranged to be actuated by the plunger and an electric switch 162 is arranged to be actuated upon presence in its initial position of a pan to be fed. Both of these switches are in series with the motor in such manner that up-position of the plunger and the presence in its initial position of a pan for being fed must both be insured before feeding movement of the pan can take place. The switch 161 is preferably a normally open push button switch and the switch 162 is preferably a normally closed push button switch, urged correspondingly by springs 157, 158.

In the form shown, the switch 161 is fixed to a lug 163 fixed to the bracket 23, its button 164 being arranged to be moved by a finger 165 on an adjustable bolt threaded into the plunger and held in adjusted positions by a jam nut 166. The finger is rotatable on said bolt 159 so as to be placed in line with the button 164, being clamped in adjusted position between a nut 160 and the head of the bolt.

The switch 162 is secured to the base. Its button 167 is arranged to be contacted by a finger 168, shown as a bolt threaded into a threaded bearing 169 on a lever 170 and clamped in adjusted positions by a jam nut 171.

The lever 170 is pivoted on a pivot pin 172 extending through a bearing 173 on said lever and bearings 174 on lugs extending from the base 26. A weight 175 is adjustable on that end of said lever on which the finger 168 is located to exert sufficient force by downward movement of said end of said lever to operate the switch 162. The other end of said lever is contacted by the pan placed upon the runways for being fed to the plunger, the cover 129 having an opening 176 through which said other end extends.

The weight of the pan depresses the end of the operating lever thereunder for raising the finger 168 for closing of the switch 162, and actuation of the electric motor 141 when said switch and the switch 161 controlled by the plunger are both in closed relation so as to complete the motor circuit, whereupon the crank shaft 142 begins to turn for moving the cross head 139 in feeding direction, thereby swinging the feeding levers 127 on their pivots 128 on the carriage 123 and moving said fingers into engagement with the respective pans, the heels of said levers then contacting the carriage for arresting the swinging movements of said levers and causing further feeding movement of the feed bars 137 to be expended in feeding movement of the pans, whereby the fingers, the bars and the carriage are all moved in feeding direction for feeding the pan just filled away from under the plunger and feeding the next empty pan to a position centrally under the plunger, the filled pans being successively moved from under the plunger and continuing in their intermittent movements in discharging direction or being removed by the attendant.

As soon as the last empty pan which has been previously placed upon the runways for depressing the inner end of the switch actuating lever thereunder, has been moved in feeding direction past the depressed end of said lever, the said end of the lever rises by gravity, induced by the weighted end of said lever, for automatically opening the switch 162 and thereby deenergizing the motor and causing cessation of feeding movement of the pans. The feeding movements of the pans continue sufficiently throughout the stroke of the crank so as to successively center the pans under the plunger.

The feeding stroke of the pans takes place during movement of the axis of the crank pin 146 throughout one-half its circle of movement in the direction of the arrow $a$, represented by the movement of the axis of the crank pin above the horizontal plane in which the axis of rotation of the crank shaft 142 is located. Coasting of the motor ceases in practice immediately upon or after the feeding stroke is completed, with the feeding fingers in retracting position upon cessation of operation of the motor, so that a slight coasting of the motor is not detrimental. Upon retracting movement of the operating bars 137, the feeding fingers are moved downwardly out of the way of the pans before retracting movement of the carriage takes place. The motor picks up the movement of the fingers and carriage at the points where they last ceased, upon reenergizing the motor for the next feeding operation.

The base may be provided with gages 181 at the respective sides thereof for gaging the initial positions of the pans placed for feeding movement.

The pans are arranged to be fed between side rails 182, adjustably positioned at the respective sides of the base by bolts 183, located in transverse slots 184 in the base, said bolts having square shanks 185 in said slots to limit their turning, the shanks of the bolts passing through holes in said side rails and having clamp nuts 186 threaded over their threaded ends to clamp the side rails in adjusted positions to the base.

Hold down guides 188 extend above the tops of the pans in advance of the positioner to guide the pans under the positioner and the plunger. These hold down guides have rearwardly drooping guide faces arranged to be contacted by the advancing upper edges of the pans to counteract any upward tilting tendency of said advancing edges while the pans are being pushed by the fingers 126. These guides are on uprights 189 having feet 190 adjustably secured to the base 26 by bolts 191 in slots 192 in said feet and threaded into the base.

As the filled pan is pushed from under the raised plunger, the forward edge of the positioner or presser part scrapes the top of the meat dough in the pan, which may in parts extend higher than the upper edge of the pan, and levels the top surface of the meat dough in the pan.

The rear edge of the pan passes across the lower face of the plunger closely adjacent to the plunger and acts as a scraper scraping the meat dough between the pan and the plunger into the pan. In this manner the top of the meat dough in the pan is level and waste of the meat dough outside of the pan is avoided.

In operation, the stuffing machine 41 is provided with a charge of meat dough, representing the plastic material, above its piston, the cover of the shell 44 being clamped in place in usual manner. The valves 42 and 47 are opened for exerting pressure under the piston, whereby to raise the piston and cause flow of the meat dough through the valve 42.

The plunger 13 is normally in raised position and the automatic valve 36, 37 is normally closed. The switch 161 is closed and the switch 162 is open. A pan is placed on the runways 121, in rear of the plunger, and a pan is placed on the runways against the gages 181, thereby depressing the raised inner end of the lever 170 and closing the switch 162. The motor is thereby actuated and the pans fed, the first advanced empty pan being fed to proper position under the plunger, and the last empty pan being fed off of the inner end of the lever 170 and thereby causing opening of the switch 162 for cessation of operation of the motor and of feeding movement of the pans.

The operating handle 106 is now depressed, thereby depressing the positioner 65 for definitely correctly positioning the pan and causing pressure upon the pan, and if the pan position is correct, releasing the latch 96.

The plunger thereupon descends for opening the automatic valve 36, 37, it being assumed that the meat dough passages in the plunger have been previously filled with meat dough. As soon as the automatic valve opens, feeding of the meat dough into the plunger begins. The dropping of the plunger is rapid, but is cushioned by the air in the pan, which is forced out of the pan by the plunger. The plunger in its movement is guided by the positioner 65. The meat dough is fed into the bottom of the pan under the plunger, as exemplified in Fig. 7. As the forced feeding of the meat dough continues, the plunger is raised by the meat dough between it and the bottom of the pan, the pressure thus exerted on the meat dough in the pan discharging all air between the plunger and the pan and in the meat dough, and solidifying the meat dough in the pan, and excluding all air pockets and bubbles between the plunger and the pan and in the meat dough. The positioner and plunger form a cover for the pan to close the pan during the feeding of the meat dough into the pan, air however being permitted to escape as stated. As the plunger is raised by the pressure of the meat dough being fed into the pan, the positioner, which forms the margin of the cover about the plunger, serves as a scraper for the sides of the plunger, which has sliding connection with said margin, in order to scrape any meat dough, which may be forced upwardly at the sides of the plunger between the plunger and the side walls of the pan, off the plunger as the plunger is retracted. The cover holds the meat dough in the pan and prevents its exuding over the top of the pan during the filling operation.

The operator having released the operating handle, the positioner 65 and latch 96 automatically return to normal positions. When the plunger has been raised by the meat dough, the keeper 95 reengages the latch 96 for holding the plunger and the positioner in up-position. The rising of the plunger to full extent causes closing of the switch 161.

When the motor begins to operate for moving the crank pin 146 in feeding direction, the feeding fingers 126 are first raised into engaging relation with the pans on the runways and then actuated in feeding direction for feeding the filled pan from under the plunger and feeding the next empty pan into position under the plunger, the feeding distance being the width of a pan plus the distance between neighboring pans, represented by the full stroke or diameter of the path of the axis of the crank pin 146.

The two switches in series in the motor circuit insure safety of operation because the plunger must be in up-position out of the path of moving pans in order to close the switch 161 and a pan must have been placed on the runway to supply the place of the filled pan in order to close the switch 162, which insures that a pan shall always be in place under the plunger upon the next actuation of the operating handle 106 by the operator. If the pan is not properly placed under the plunger, the depending fitting flanges of the intermediate cover cannot be moved downwardly sufficiently to release the latch 96, compelling the operator to properly place the pan before he can proceed with his operations.

My improved device is simple in construction and operation and insures that the plastic material is solidly filled into the receptacles to remove air and exclude air pockets and bubbles from between the plunger and the receptacle and from the material, and prevents the formation of fissures and seams in the material and the presence of separated meat portions in baked loaves, when employed in filling meat pans with meat dough for baking purposes, and provides simple means for keeping the apparatus supplied with pans and preventing accidents in operation.

Having thus fully described my invention, what I claim as new and desire to secure by Letters Patent, is:

1. In receptacle filling means for plastic material, the combination of a feeding head, and a guide having guiding faces for both said feeding head and the receptacle, said head having slide connection with said guide by means of one of said guiding faces and said guide located about said head and in line with the receptacle to coact with the receptacle whereby to place the receptacle in filling position by coaction between the other of said guiding faces and said receptacle for centering said feeding head and the receptacle with relation to each other, said feeding head having a material pressing end substantially cross-sectionally filling the receptacle and provided with material feeding means for material under pressure, said feeding head having a feeding mouth in said pressing end of substantially less cross-sectional area than the cross-sectional area of said pressing end, means normally holding said feeding head and the receptacle in relatively retracted relation for stoppage of material feeding, and arranged for approach between said feeding head and the receptacle for initiating material feeding and exerting pressure between said guide and the receptacle, said feeding head and the receptacle being relatively resistantly retractable to exert pressure on the material being so fed under pressure between said pressing end of said feeding head and the receptacle throughout substantially the filling of the receptacle to exclude air pockets in the plastic material.

2. In receptacle filling means, the combination of a plunger arranged to normally move into the receptacle, a latch to retain said plunger in retracted position, a lever having limited movement and normally urged in retracting direction, and a releasing lever pivoted to said first-named lever and having operative connection with said latch to release said latch and said connection acting as a fulcrum on which to move said first-named lever in limited movement direction.

3. In receptacle filling means, the combination of a standard comprising a bearing, a plunger reciprocable in said bearing arranged to normally move into the receptacle, a latch to retain said plunger in retracted position, a lever having pivotal connection with said standard, means to normally urge said lever in retracting direction, means to limit movement of said lever in operative direction, and means on said lever to operate said latch.

4. In receptacle filling means, the combination of a standard, a bearing, a plunger reciprocable in said bearing arranged to normally move into the receptacle, a latch to retain said plunger in retracted position, a lever having pivotal connection with said standard, a spring to normally urge said lever in retracting direction, a second lever pivoted to said first-named lever and acting on said latch to release said latch and fulcrumed on said first-named lever to move said first-named lever, and means to limit such movement of said first-named lever.

5. In receptacle filling means, the combination of a standard including a bearing, a plunger reciprocable in said bearing arranged to normally move into the receptacle, a latch to retain said plunger in retracted position, and a positioner for the receptacle having pivotal connection with said standard.

6. In receptacle filling means, the combination of a standard including a bearing, a plunger reciprocable in said bearing arranged to normally move into the receptacle, a positioner for the receptacle, a latch for the plunger, and spaced apart substantially parallel links pivoted at their respective ends to said standard and to said positioner for substantially parallel movements of said positioner, and having operative connection with said latch to release said latch.

7. In receptacle filling means, the combination of a standard including a bearing, a plunger reciprocable in said bearing arranged to normally move into the receptacle, a positioner for the receptacle, a latch for the plunger, spaced apart substantially parallel links pivoted at their respective ends to said standard and to said positioner for substantially parallel movements of said positioner, and a lever pivoted to one of said links and operatively connected with said latch to release said latch and said connection acting as a fulcrum on which to move said links and said positioner toward the receptacle.

8. In receptacle filling means, the combination of a standard including a bearing, a plunger reciprocable in said bearing arranged to normally move into the receptacle, a positioner for the receptacle having guiding connection with said plunger, a latch for the plunger, a link extended as a lever pivoted to said standard and to said positioner and having operative connection with said latch to release said latch, a spring to normally retract said link, a stop to limit such retraction, and a second link pivoted to said standard and to said positioner and spaced from and substantially parallel with said first-named link, said links compelling movements of said positioner parallel with said plunger.

9. In receptacle filling means, the combination of a base, a receptacle support thereat, an upright extending upwardly from said base, a bearing on said upright, a plunger reciprocable in said bearing, a positioner for the receptacle about said plunger, spaced apart substantially parallel links pivoted to said upright and to said positioner for movements of said positioner substantially parallel with said plunger, means supported by said upright to urge retracting movements of said positioner, a latch for said plunger supported by said upright, and means for adjusting said upright vertically with relation to said base whereby to adjust the elevation of said plunger and said positioner with relation to said receptacle support.

10. In receptacle filling means, the combination of a receptacle support, a feeding head thereabove, means for reciprocable movement between said head and the receptacle on said support, moving means for moving the receptacle into line with said feeding head, and actuating means for said moving means including a plurality of interrupting means, one of said interrupting means being under influence of said feeding head to connect said interrupting means when said feeding head is in retracted position, and another of said interrupting means acted on by the presence of a receptacle to connect said last-named interrupting means, for safety feeding movement of the receptacles under said feeding head.

11. In receptacle filling means, the combination of a receptacle support, a feeding head thereabove, means for reciprocable movement between said head and the receptacle on said support, feeding means for the receptacle, and actuating means for said feeding means including a pair of interrupting means both of which must be connected for movement of the receptacle, one of said interrupting means connected by retracted positioning of said head and the other of said interrupting means connected by a receptacle placed for feeding movement.

12. In receptacle filling means, the combination of a feeding head, a receptacle feeding part, means for reciprocable movement between said head and the receptacle, an electric motor for actuating said feeding part, and an electric circuit for said motor including a pair of electric switch devices one of which is influenced by retracted position of said feeding head and the other of which is influenced by the presence of a receptacle in feedable position for actuation of said motor and feeding movement of the receptacle.

13. In receptacle filling means, the combination of a feeding head, a receptacle support thereunder, feeding means for the receptacles on said support, actuating means for said feeding means including an electric motor, and an electric circuit for said motor including a pair of electric switches one of which is operated by retracted position of said feeding head and the other of which is operated by placing of a receptacle in feedable position for energizing said motor to feed the receptacles, and said last-named switch operated to deenergize said motor by fed movement of said placed receptacle.

14. In receptacle filling means for plastic material, the combination of a frame, means acting to force feed plastic material, a material resistant part substantially cross sectionally filling the receptacle and located adjacent to the bottom of the receptacle at the beginning of the filling operation, means on said frame wherewith to so relate said material resistant part and said bottom, said means including a pair of relatively movable members, one of which has connection with said material resistant part and the other of which has connection with said frame, said material resistant part provided with a feeding mouth for the force fed plastic material located so as to discharge the force fed plastic material between said material resistant part and the bottom of the receptacle to cause separating movement between said material resistant part and the receptacle by the pressure of the force fed plastic material during the filling of the receptacle, and a valve for the material formed in said respective members and operated by such movement.

15. In receptacle filling means, the combination of a plunger arranged to move into the receptacle, a latch to retain said plunger in retracted position, a lever arranged to be moved in retracting direction, and a releasing lever pivoted to said first-named lever and having operative connection with said latch to release said latch, and said connection acting as a fulcrum on which to move said first-named lever.

16. In receptacle filling means, the combination of a feeding plunger arranged to move into the receptacle, a presser part for the receptacle, holding means for the plunger, and a lever having operative connection with said presser part to move the presser part and said lever further having releasable connection with said holding means to release said plunger from said holding means for movement of said plunger into the receptacle.

17. In receptacle filling means, the combination of a plunger arranged to move into the receptacle, a latch to retain said plunger in retracted position, a presser part for the receptacle, a lever having operative connection with said presser part to move the same, a second lever pivoted to said first-named lever and having operative connection with said latch to release said latch and to exert pressing force on said first-named lever, and a stop to limit said last-named movement.

18. In receptacle filling means, the combination of a plunger arranged to move into the receptacle, a presser part for the receptacle, a latch for the plunger, a lever for operating said presser part, and a second lever having pivotal connection with said first-named lever and operative connection with said latch to release said latch, said last-named operative connection being such as to limit pressing movement of said first-named lever.

19. In receptacle filling means for plastic material, the combination of a cover for the receptacle including a margin coacting with the rim of the receptacle to close the receptacle and a feeding plunger moving in said margin during the feeding of the plastic material into the receptacle, means to normally position said cover so that the bottom of said margin is substantially on a level with the upper end of said rim, means to provide lateral movement between said cover while in said normal position and the receptacle, said margin formed as a scraper for the plastic material in the filled receptacle during such lateral movement between said cover and the receptacle.

20. In receptacle filling means for plastic material, the combination of a cover for the receptacle including a margin coacting with the rim of the receptacle to close the receptacle and a feeding plunger moving in said margin during the feeding of the plastic material into the receptacle, means to normally position said cover and said plunger and the receptacle so that the bottoms of said margin and of said plunger are substantially on a level with the upper end of said rim, means to provide lateral movement between said cover and said plunger while in said normal positions and the receptacle, said plunger having a feeding mouth at its bottom, said margin formed as a scraper for the plastic material in the filled receptacle during such lateral movement between said cover and said plunger and the receptacle, and said rim of the filled receptacle formed as a scraper for said bottom to scrape plastic material therefrom during such lateral movement between said receptacle and said cover and plunger.

21. In receptacle filling means for plastic material, the combination of a cover for the receptacle including a margin coacting with the rim of the receptacle to close the receptacle and a feeding plunger moving in said margin during the feeding of the plastic material into the receptacle, means to normally position said cover and said plunger and the receptacle so that the bottoms of said margin and of said plunger are substantially on a level with the upper end of said rim, means for lateral movement between said cover and said plunger while in said normal positions and the receptacle, said plunger having a feeding mouth at its bottom, said margin formed as scraping means for the sides of said plunger, said margin formed as a scraper for the plastic material in the filled receptacle during such lateral movement between said cover and said plunger and the receptacle, and said rim of the filled receptacle formed as a scraper for said bottom to scrape plastic material therefrom during such lateral movement between said receptacle and said cover and plunger.

22. In receptacle filling means, the combination of a plunger arranged to move into the receptacle, a latch to retain said plunger in retracted position, a presser part for the receptacle, a lever having operative connection with said presser part to move the same, a second lever pivoted to said first-named lever and having operative connection with said latch to release said latch and to exert pressing force on said first-named lever, and a stop to limit pivotal movement of said latch.

OSCAR C. SCHMIDT.